Patented July 18, 1933

1,918,996

UNITED STATES PATENT OFFICE

MAX WEGER, OF ERKNER-BERLIN, GERMANY, ASSIGNOR TO BAKELITE GESELLSCHAFT MIT BESCHRANKTER HAFTUNG, OF BERLIN, GERMANY

PROCESS OF PREPARING MOLDING SUBSTANCES AND MOLDED ARTICLES FROM SYNTHETIC RESINS AND FILLERS

No Drawing. Application filed September 4, 1930, Serial No. 479,800, and in Germany September 18, 1929.

In Röntgen and radium therapeutics special care must be taken to direct the rays in certain specific directions in order to avoid the undesirable effects of the rays. For this purpose screens or other pieces of apparatus of most varied form are made for the manufacture of which in the past metals with especially high atomic weights have been used. Among these metals, lead for example plays an important part and is used in various forms for this purpose. The screens or similar apparatus are adapted as much as possible in their form to the respective purposes for which they are to be used.

It has now been found that, for short wave rays, for example, Röntgen and radium rays, impenetrable or slightly penetrable screens or other pieces of apparatus of considerable effectiveness, can be made in any desired form and color in a simple step of casting, molding, or a similar process, and as a rule without mechanical after-treatment, if metallic lead, in finely divided condition, for example, as a powder, or as a suitable lead compound, is mixed as a filler with hardenable synthetic resins, and the substances obtained are processed in the usual way. A mixture of metals and metallic compounds may also be used. First of all, the condensation products of phenols and formaldehyde or other aldehydes may be used; furthermore, urea-aldehyde condensation products, glycerine-phthalic acid resins, etc. may also be used, either alone or in mixture with one another. These products can be processed when mixed with any of the suitable filling and coloring substances, as for example wood flour, asbestos, graphite, cellulose esters and proteids (casein) and also when mixed with other natural and synthetic resins, such as colophony, coumaron resin, etc. As lead compounds all of those which can be processed with the synthetic resins, at the working temperatures, in the quantity needed, without showing disintegration or any injurious effects, may be used. For example lead sulfate, lead phosphate, lead chromate, lead fluoride, etc. are satisfactory, either alone or in mixture with one another. Basic reacting lead compounds, such as lead oxide (PbO), lead hydroxide, lead sulfide, lead superoxide, red lead, basic lead salts or mixtures of these substances may also be used. The addition of these compounds must be so calculated that no harmful effects are noted on the normal ingredients of the synthetic resins. Consequently only as much of the lead oxides is used as will insure that the ingredients present in the synthetic resins, which will react with bases, are transformed into combined form. By using lead oxides in larger quantities, the moldability of the synthetic resins may be influenced unfavorably. Therefore in practise the lead oxides and similarly acting lead compounds are used in mixture with other lead compounds which can be added to the synthetic resins in larger quantities without injurious effect. Lead cresolate or lead phenolate may also be the starting points, and these solid substances may be processed with a hardening agent, such as paraformaldehyde, and with fillers of any desired kind, as acetylcellulose or wood flour. It is desirable to keep the percentage of lead or lead compounds as high as possible.

To carry out the invention, instead of lead other metals of high atomic weight and their compounds, which are likewise difficultly penetrable or impenetrable to short-wave rays, may also be used. Thus uranium in particular, but also thorium, thallium, or compounds of these metals are available. What was said of lead, pertains also to these metals or their compounds. Mixtures of several metals or their compounds may be made.

*Example 1.*—20 kilos hardenable phenol-formaldehyde resin, 10 kilos wood flour, and 70 kilos lead sulfate, are made into a homogeneous mixture.

*Example 2.*—18 kilos hardenable phenol-formaldehyde resin, 5 kilos wood flour, 5 kilos acetyl cellulose, 70 kilos powdered lead, and 2 kilos lead oxide (PbO), are made into a homogeneous mixture.

*Example 3.*—70 kilos lead phenolate, 7 kilos paraformaldehyde, 10 kilos wood flour, and 10 kilos lead sulfate, are worked up as in Example 2.

The molding mixtures are worked in the usual manner. Thus they may be molded in hot presses under simultaneous application of heat and pressure, or poured into molds and hardened by heat alone, etc. Naturally molding materials may first be made, then objects of the desired form made by mechanical treatment of the plastics.

I claim:

1. Process of preparing resinous compositions substantially not penetrable by short-wave rays which comprises reacting a phenolic ingredient with an aldehyde, said phenolic ingredient including a phenolic compound of a metal of the group consisting of lead, uranium, thorium and thallium.

2. Process according to claim 1 in which a filler is admixed with the resinous composition to form a moldable mixture, said filler having as a constituent a finely divided form of a member of the group consisting of metals of high atomic weight and their compounds.

3. Process of preparing resinous compositions substantially not penetrable by short-wave rays which comprises reacting a phenolic compound of a metal of the group consisting of lead, uranium, thorium and thallium with an aldehyde.

4. Molding mixture for the preparation of articles resistant to the penetration of short wave rays comprising a filler and a synthetic resin having in chemical combination a member of the group consisting of metals of the group consisting of lead, uranium, thorium and thallium.

MAX WEGER.